United States Patent
Kammiller

[11] Patent Number: 5,923,548
[45] Date of Patent: Jul. 13, 1999

[54] ACTIVE CLAMP USED TO MAINTAIN PROPER CURRENT TRANSFORMER OPERATION

[75] Inventor: Neil A. Kammiller, Lorain, Ohio

[73] Assignee: Reltec Corporation, Lorain, Ohio

[21] Appl. No.: 08/827,235

[22] Filed: Mar. 28, 1997

[51] Int. Cl.[6] .................................................. H02M 7/122
[52] U.S. Cl. ............................................................. 363/56
[58] Field of Search ................................. 363/16, 17, 50, 363/55, 56, 97, 98, 131, 132

[56] References Cited

U.S. PATENT DOCUMENTS

| | | |
|---|---|---|
| 4,605,865 | 8/1986 | Yuzurihara . |
| 4,659,942 | 4/1987 | Volp . |
| 4,958,268 | 9/1990 | Nagagata et al. .......................... 363/16 |
| 5,057,698 | 10/1991 | Widener et al. . |
| 5,068,776 | 11/1991 | Polivka . |
| 5,157,592 | 10/1992 | Walters . |
| 5,379,206 | 1/1995 | Davidson ................................... 363/55 |
| 5,418,703 | 5/1995 | Hitchcock et al. . |
| 5,488,554 | 1/1996 | Green ......................................... 363/25 |
| 5,610,508 | 3/1997 | Kammiller . |
| 5,636,107 | 6/1997 | Lu et al. .................................... 363/20 |

*Primary Examiner*—Matthew Nguyen
*Attorney, Agent, or Firm*—Fay, Sharpe, Beall, Fagan, Minnich & McKee

[57] ABSTRACT

An active clamp used to maintain proper current transformer operation in a resonant transition converter circuit or any circuit having a wide range of reverse current present in a current transformer primary at the beginning of a power pulse. The active clamp is connected directly to a secondary of the current transformer and is placed in an active state for the duration of the "on" time of a switch associated with a particular current transformer. A diode, FET combination of the active clamp provides a path for current to flow when primary current is reversed or negative flow. Thereby only small amounts of voltage, and thus volt-seconds will be developed on the transformer during reverse primary current, in turn keeping the current transformer out of reverse saturation. A resistive-capacitive network allows the active clamp to use the circuit drive signal to place the active clamp in an on state.

17 Claims, 9 Drawing Sheets

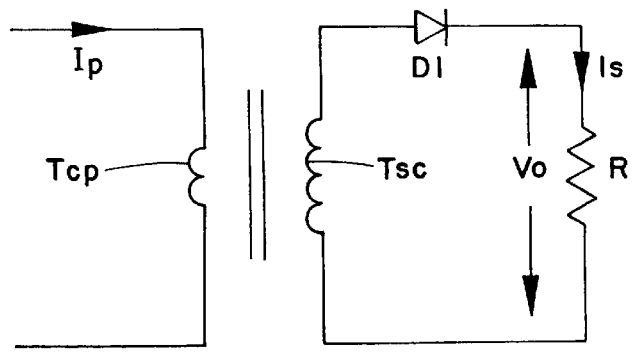
FIG. 3 (PRIOR ART)
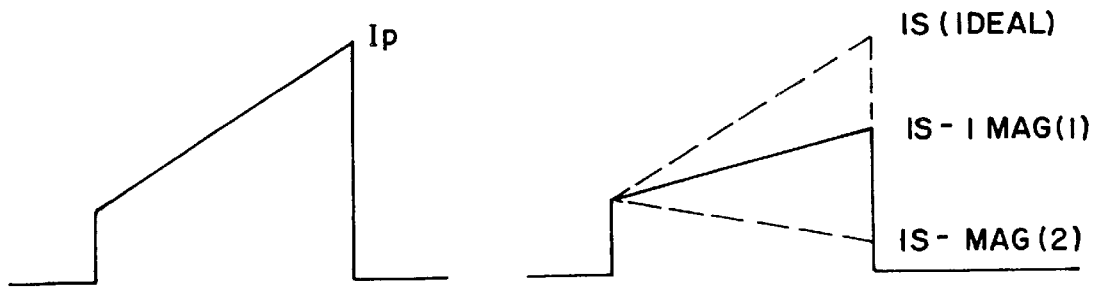
FIG. 4a (PRIOR ART)  FIG. 4b (PRIOR ART)
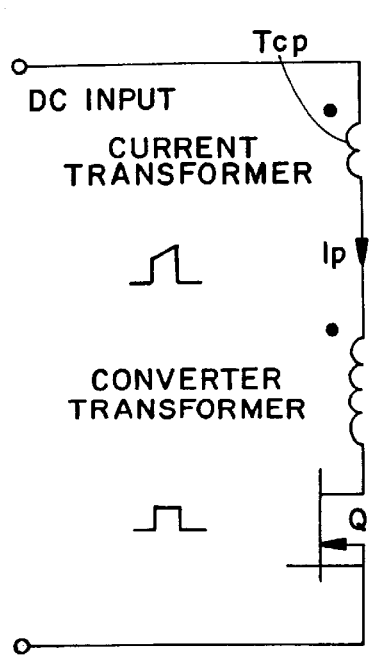
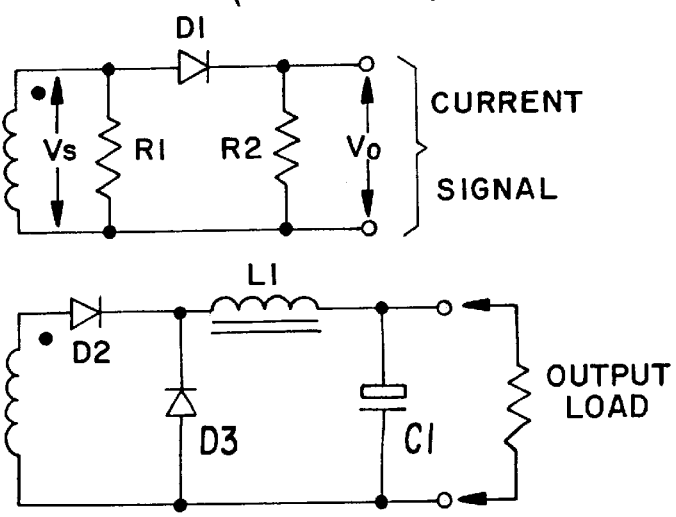
FIG. 5 (PRIOR ART)

ACTIVE CLAMP USED TO MAINTAIN PROPER CURRENT TRANSFORMER OPERATION

BACKGROUND OF THE INVENTION

The present invention relates to an active clamp circuit used to assist in maintaining proper operation of a current transformer, and more particularly to circuitry to maintain proper current transformer operation in a resonant transition converter circuit or any other circuit having a wide range of reverse current present in a current transformer primary at the beginning of a power pulse.

FIG. 1 illustrates a phase shifted full-bridge converter with FET transistor switches Q1, Q2, Q3 and Q4 operating at a fixed frequency. In order to lower the power dissipation in this circuit zero-voltage switching techniques are implemented where a switch begins conduction with a near zero-voltage existing across the switch.

The "on" time of the diagonally conducting switches (i.e. Q1 and Q4 or Q2 and Q3) is not varied as in a PWM bridge type circuit, rather the switches in a first leg (Q1 and Q2) and a second leg (Q3 and Q4) are made to conduct at a duty cycle approaching 50%. The waveforms for such switching are shown in FIG. 2. The phase shift between the operation of the devices of each of the legs determines when diagonal switches are conducting at the same time and, therefore, supplying power to a load. By varying the phase shift, the resulting output voltage can be pulse width modulated. In the converter, transformer primary current flowing at turn-off of one transistor charges the parasitic capacitance of that transistor while reducing the charge on the parasitic capacitances of the other transistor in the same leg, thereby reducing the voltage across the transistor, which is also the next transistor to be turned on. Obtaining zero-voltage switching requires that the turn-on of the transistor in the same leg with a transistor that was just turned off must be delayed until the voltage across the transistor has been reduced to near zero.

At the moment of turn-off of each transistor switch Q1–Q4, there needs to be present in that switch a lagging current of sufficient amplitude and duration to cause the voltage on that switch to rise to the amplitude of the supply in a totally passive fashion. At heavier loads, this current will be present in the series inductance of the power transformer. At lighter loads, the current may be obtained from energy stored in the shunt inductance of the power transformer.

However, as the load approaches no-load and the phase angle approaches 0°, the volt-seconds applied to the power transformer primary approaches zero, and the energy stored in the power transformer primary which is available as a lagging current for resonant transition also approaches zero. In such a situation resonant transition can fail. As the load approaches a no-load situation the currents are basically comprised of inductive currents. Since the current in the power transformer is inductive, the current will ramp up, level off and then it will ramp down in the other direction and then again level off.

It is known that, especially at lighter loads, the currents in the FET switches will have both forward (positive) current and reverse (negative) current. In most circuits current flows only in one direction, for example into the drain of a transistor. In this circuit when the switches are activated by a power pulse reverse current will flow and this reverse current may last as long as half of the power pulse.

It is also known that converters, supplies and many other devices employ current transformers to assist in control operations. Among other applications current transformers are used to indicate transitions or changes, and to measure values including peak values, within a circuit. Benefits of using current transformers for control and limiting applications include their ability to provide good signal-to-noise ratio, isolation between the control circuit and the line being monitored, good common-mode rejection, and that they do not introduce excessive power loss in high-current applications.

In general, for current transformers, the larger the inductance, the smaller the magnetizing current and the more accurate the measurement. The magnetizing current component increases during the pulse duration and will be subtracted from the quantity to be measured. Consequently, at the end of a conduction pulse, the magnetizing current should be small compared with the measured quantity. For current limiting applications, a magnetizing current of 10% is a typical design limit. This magnetization effect is most easily shown in a uni-directional current transformer.

FIG. 3 shows a typical uni-directional current transformer and secondary circuit. The current transformer primary $T_{cp}$ has a single turn. The primary turn is thus in series with a line to be monitored.

The current transformer secondary $T_{sc}$ has a larger number of turns, which are terminated in resistor R via diode D1. The intention is that a true voltage analogue of the primary forward current pulse $I_p$ be developed across R. D1 blocks a reverse recovery voltage. However, it will be seen from FIGS. 4a and 4b that the secondary waveform is distorted as a result of the magnetizing current component.

FIG. 4a illustrates the applied all positive primary current pulse $I_p$. FIG. 4b depicts the corresponding secondary current analogue pulse developed across R. The effect of two values of secondary magnetizing current, a small value $I_{mag1}$ and a large value $I_{mag2}$, details how the magnetizing current is effectively subtracted from the ideal transformed current analogue $I_{s(ideal)}$. From this diagram it is clear that if the peak value of the current at the end of the conduction pulse, $I_p$, is to be useful for current-limiting purposes, then the secondary shunt inductance of the current transformer must be large enough to ensure that at least a positive slope remains on the net secondary waveform. This means that a sizeable secondary inductance is needed, and so a larger number of secondary turns, a larger core, and high-permeability core material are desirable.

A second major factor that influences the current transformer magnetizing current is the magnitude of the secondary voltage. This voltage is the sum of a selected signal voltage $V_o$ and the rectifier diode D1 forward voltage drop. Larger secondary voltages are advantageous (consistent with a good signal-to-noise ratio), however, large values of $V_o$ will result in large magnetizing currents.

If a smaller core is chosen for the current transformer, then to get the required inductance, a larger number of secondary turns will be required. If the number of secondary terms is too large, then there will be significant interwinding capacitance, and the high frequency response (response to narrow current pulses) will be degraded.

FIG. 5 illustrates a basic arrangement of a uni-directional type current monitoring transformer in a single-ended forward converter.

In this example when the primary power transistor $Q_1$ is on, the forward current in the current transformer primary $T_{cp}$ takes the start of all windings positive, and the secondary diode D1 conducts. The current in R2 will be a transform of the primary current and an analogue voltage of the primary current will be developed across R2.

When Q1 turns off at the end of the forward current pulse, rapid reset of the current transformer core occurs as D1 acts as a block and the secondary flyback load resistance R1 is high. As a result, the flyback voltage is large, and this gives a rapid core reset between forward pulses. That is, the flux density β returns to a residual value $β_r$ during the off time ready for the next forward pulse.

A βH curve as shown in FIG. 6 is used to depict the amount of flux density β which results from increasing the amount of a field intensity H. $β_r$ represents the residual flux density of a system such as that presently under consideration when the transformer has been reset. $β_w$, which is the working value of flux density, represents when the transformer has stored energy. $β_s$ and $-β_s$ represent when the transformer has become saturated.

As shown in FIG. 7 current transformers $C_{T1}$, $C_{T2}$ may be placed in the drains of FET switches Q1 and Q2. Signals $S_1$, $S_2$ produced from each the current transformers $C_{T1}$, $C_{T2}$ are combined and are used as an input signal $S_{12}$ for current controller $C_c$. Input signal $S_{12}$ is used to determine the amount of current which needs to be delivered to the circuit (i.e. $Q_1$–$Q_4$) in the form of a power pulse.

Problems arise in the converter of FIG. 7 when the resonant transition circuit is operating at or towards a no-load situation. As previously mentioned, reverse currents will exist in the FET transistor switches implemented in this circuit, and at light loads the reverse currents become quite substantial.

During normal operation, of the circuit shown in FIG. 7 the switches are on for 50% of the time. This again is different from straight pulse width modulated, PWM, circuitry where the "on", time of the switches can be varied from 50% to 0%. During normal operation when the switch in question is "on" energy is stored in the inductor or the core of the transformer. Therefore, during normal operation when the switch is "on" energy is being stored in the core. When the "on" half cycle is over, and the FET current is gone, the stored energy will come out of the core to produce a reverse voltage on the transformer allowing the transformer to be reset.

At light loads the current at the start of the power pulse will be reverse or negative current, and it may be a heavy reverse or negative current that stays for half the power pulse. In such a situation, this heavy reverse or negative current will reset the current transformer into a heavy negative saturation $-β_s$ and a large amount of energy is stored during this negative saturation. When the FET current reaches zero during the power pulse in a positive going transition, the energy that was stored during the reverse or negative current portion (the energy that is stored during the negative saturation of the current transformer) comes out and begins building a floating "pedestal" under the current pulse signal. This causes unstable responses from the current transformers which in turn provides unpredictable and unstable operation of the converter circuit.

To address the preceding problems, the inventor previously filed an application and received, U.S. Pat. No. 5,610,508 which describes a circuit directed to maintaining proper current transformer operation in a resonant transition converter circuit or any circuit having a wide range of reverse current present at a current transformer primary at the beginning of a power pulse.

A circuit described in U.S. Pat. No. 5,610,508 is illustrated in FIG. 8, which is a full bridge resonant transition converter circuit having a fixed frequency, phase shifted mode of operation. The circuit generally operates in a manner similar to the circuit set forth in FIG. 7, and includes switches SW1–SW4 (which in this embodiment are implemented by FET transistor arrangements) with current transformers 10 and 12 associated with switches SW1 and SW2 respectively. The outputs of current transformers 10, 12 are combined and input to a current comparator 14 via input 16 an analog of reference current $I_{ref}$ is input to current comparator 14 via input 18. Using this information a controller 20 controls the timing at which power pulses are provided to switches SW1–SW4 via inputs 22–28. The circuit switches between diagonal and horizontal conduction. When either pairs of switches SW1 and SW4 or SW2 or SW3 are active diagonal conduction is occurring and power is being transferred from the transformer primary winding 30 to the secondary winding 32 whereby a signal is generated.

It was noted in the U.S. Pat. No. 5,610,508 patent that for such a circuit in situations from light loads to no load, significant current will flow in a reverse direction through switches SW1–SW4. When this occurs instability can enter into the system. Therefore, added to each of current transformers 10 and 12 are current generators 40, 42 and active clamps 44, 46.

The detailed configuration of the current transformer 12, switch SW2, current generator 42 and clamp 46 of FIG. 8, as described in U.S. Pat. No. 5,610,508, is illustrated in FIG. 9a. This discussion regarding the current generator 42 and active clamp 46 was noted to be equally appropriate for the arrangement in connection with switch SW1, current transformer 10, current generator 40 and active clamp 44. It was also noted to be possible that the current generators 40 and 42 and active clamps 44 and 46 may be used alone or in combination to achieve proper current transformer action during light load and no load situations.

The active clamp 46 of U.S. Pat. No. 5,610,508 was disclosed to include extra secondary or auxiliary winding 50 (in addition to the main secondary winding 48 of current transformer 12), diode 52 and FET transistor 54. When switch SW2 receives a drive pulse, FET 54 receives the same drive pulse activating active clamp 46, which acts as a load allowing the current generated due to the reverse or negative primary current $I_{pri}$ to flow through the current transformer 12. In this manner, instead of developing volt-seconds which upon the primary current becoming positive causes instability, these volt-seconds are not developed, avoiding a large negative voltage, so that normal reset action will take place. While the cited patent noted an active clamp could be implemented on the secondary winding, it required a negative signal, negative source power supply and level shifters.

In addition to active clamp 46, FIG. 9a illustrates current generator 42, provided to generate a predetermined current bias $I_{bias}$ which functions to counteract undesirable effects of the negative primary current in the current transformer at the start of a power pulse. In this arrangement bias current $I_{bias}$, which is a fraction of the primary current $I_{pri}$, is added to the secondary of the current transformer 12. For instance, if the transformer ratio is 1 to 40, then a current ¹⁄₄₀ of the primary current is developed as the bias current $I_{bias}$ to counteract the negative or reverse primary current. In the present example, with a turns ratio of 1 to 40, providing a current ¹⁄₄₀th of the primary current $I_{pri}$ results in a ampere-turns NI of magnetizing force equal to the primary current, NI=40×¹⁄₄₀, i.e. 1.

Current generator 42 switches bias current $I_{bias}$ into the current transformer secondary during the power pulse to offset the negative or reverse primary current which occurs at the beginning of a power pulse which may occur due to a shunt inductance found in power transformers and/or a resonant inductor used in such systems. At "absolute no-load" the negative portion of $I_{pri}$ can last for $\Pi/2$ radians. By injecting the appropriate bias current the positive current pulse can start at 0 radians. FIG. 9b shows the primary current $I_{pri}$ of current transformer 12. From $t_0$ to $t_1$ the primary current is flowing in a negative or reverse direction causing the current transformer core to be saturated into the negative region. Starting at $t_1$ the current changes to positive going. However, due to the negative or reverse primary current, the output of the current transformer 12 will have a false "pedestal" which causes unstable operation. This is what will be expected without the use of the bias current (and/or the active clamp).

By supplying bias current $I_{bias}$, as seen in FIG. 9c, the primary current $I_{pri}$ is shifted up such that at $t_0$ the current is at zero (0), i.e. no longer negative at the beginning of the power pulse.

The present invention provides a new and improved active clamp circuit which is implemented with a smaller number of parts, is more economical and which is more efficient than the existing active clamp used to maintain proper current transformer operation.

SUMMARY OF THE INVENTION

An active clamp circuit is provided for use with a current transformer which is in turn used in a resonant transition full-bridge converter circuit. The current transformer assembly includes a current transformer having a primary current transformer winding circuit inserted into a drain of a FET switching element of the converter circuit to carry a primary current. A secondary current transformer winding circuit is magnetically linked to the primary current transformer winding circuit to generate a secondary current when the primary current is positive. The active clamp which is activated simultaneously with and for a same time period as the power pulse, is physically connected to the secondary current transformer winding circuit to generate a clamp current when the primary current is negative.

In a more limited aspect of the present invention, the active clamp includes a clamp switch connected to the drive terminal such that receipt of the power pulse by the drive terminal simultaneously activates the clamp switch with a signal of the same polarity as the power pulse. A diode of the active clamp allows clamp current to flow when the primary current in the current transformer is negative.

A principle advantage of the subject invention resides in the provision of a cost effective active clamp which results in an improved operation of circuits having a wide range of reverse current present in a current transformer primary at the beginning of a power pulse.

Yet another advantage is allowing a resonant transition converter circuit to operate reliably in no-load, zero phase angle situations.

Still another advantage is realized in the use of an active clamp which does not allow a current transformer to enter negative saturation.

Still other advantages and benefits of the invention will become apparent to those skilled in the art upon a reading and understanding of the following detailed description.

BRIEF DESCRIPTION OF THE DRAWINGS

The present invention may take form in various parts and arrangements of parts or in various steps and arrangements of steps. The drawings are only for purposes of illustrating a preferred embodiment and are not to be construed as limiting the invention.

FIG. 3 is a schematic circuit representation of a current transformer and a secondary circuit used for uni-directional current pulse measurement;

FIGS. 4a–4b show the primary current and developed secondary current waveforms on R2, illustrating the effect of current transformer magnetization current of the current transformer of FIG. 3;

FIG. 5 details a basic arrangement of a uni-directional current transformer in a single ended forward converter;

FIGS. 9b–9c are charts of primary and bias currents in connection with the current generator of FIG. 9a;

FIGS. 11b and 11c set forth signals associated with FIG. 11a;

FIGS. 12b–12c depict waveforms associated with the current transformer of FIG. 12a;

DETAILED DESCRIPTION OF THE PREFERRED EMBODIMENT

Figure 10:
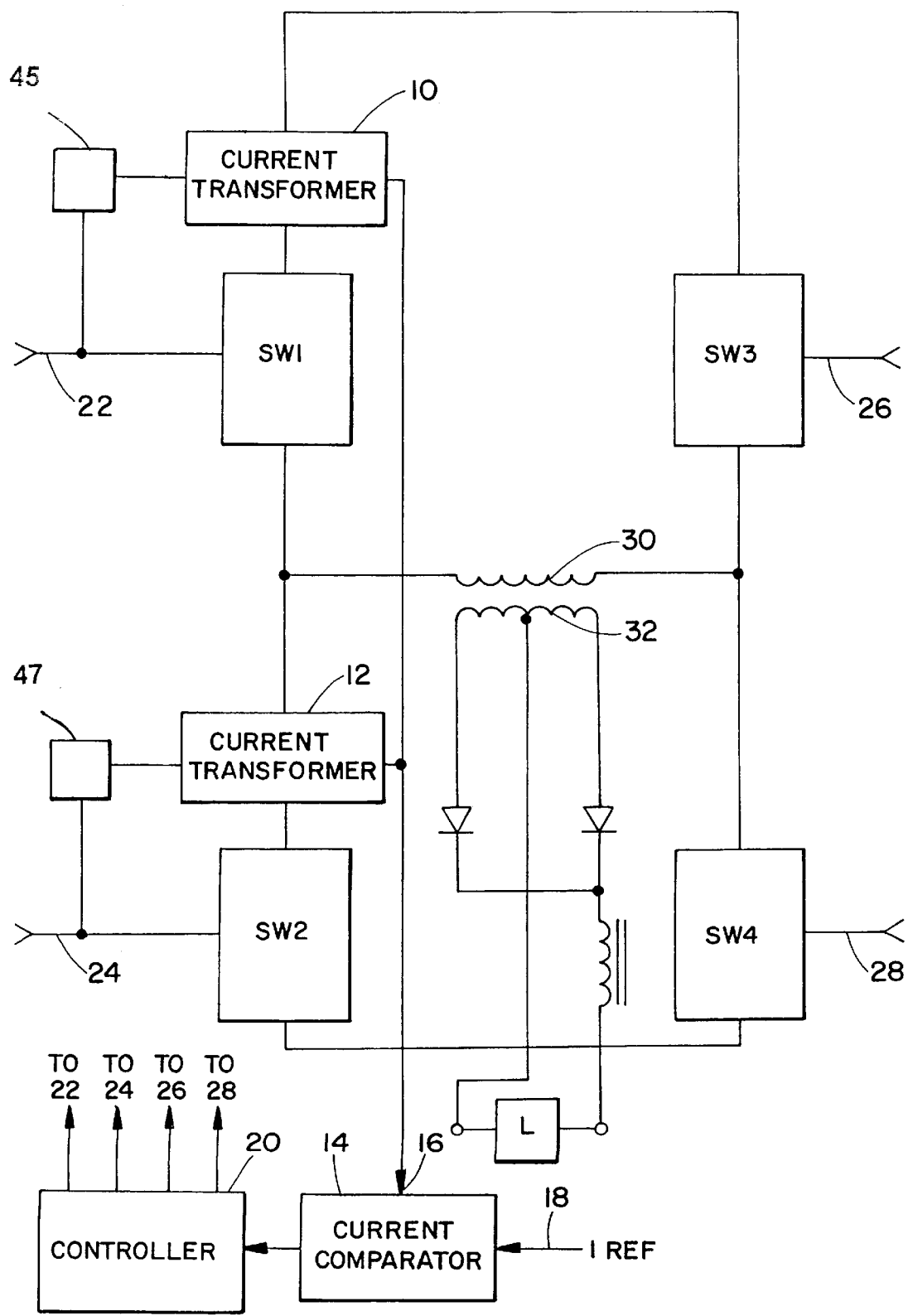
FIG. 10 depicts a schematic illustration of a circuit incorporating the active clamp of the present invention.

FIG. 10 sets forth a circuit according to the present invention where active clamps 45 and 47 are shown connected to current transformers 10 and 12, respectively. This figure is presented in this manner to correspond to the discussion regarding FIG. 13 which will follow. Returning attention to FIG. 10, circuits of this type will have a reverse current equal to the forward current. The circuit under consideration is used with a resonant transition power circuit. In this topology, a reverse current is seen by the current transformer primary. It is largest at "no-load" and is the lagging power transformer primary current which has just previously caused a resonant transition of a drain voltage and is now flowing in a FET reverse parallel diode. The false forward signals which it can cause on the secondary of the current transformer take the form of a pedestal (DC level) signal under a normal current pulse signal.

The full bridge resonant transition converter circuit of FIG. 10, has a fixed frequency, phase shifted mode of operation. Output from current transformers 10 and 12 are combined and input to a current comparator 14 via input 16. An analog of reference current $I_{ref}$ is input to current compartor 14 via input 18. Using this information a controller 20 controls the timing at which power pulses are provided to switches SW1–SW4 via inputs 22–28. The present circuit switches between diagonal and horizontal conduction. When either pairs of switches SW1 and SW4 or SW2 and SW3 are active, diagonal conduction is occurring and power is being transferred from the transformer primary winding 30 to the secondary winding 32 whereby a signal is generated.

During situations of light loads or no-load, significant current flows in a reverse direction through switches SW1–SW4, causing instability to enter into the system.

Inclusion of active clamps 45 and 47 makes it possible to maintain proper current transformer operation when a reverse current is present in the current transformer primaries at the beginning of power pulses delivered from controller 20.

Figure 11A:
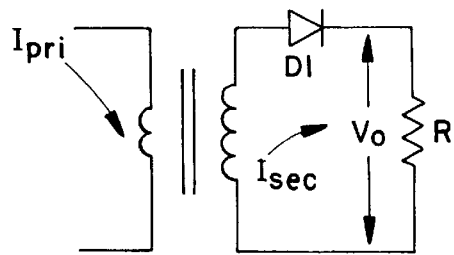
FIG. 11a depicts a simplified illustration of a current transformer operating with normal positive current.
Figure 11B:
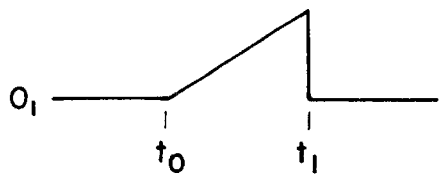
Figure 11C:
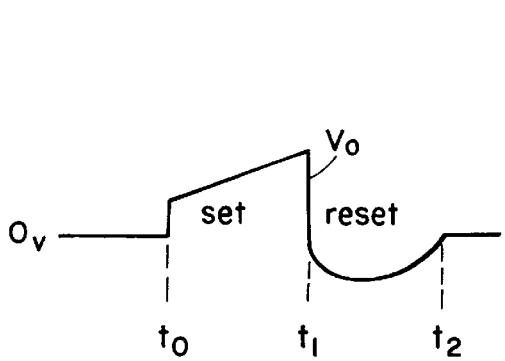
Figure 11D:
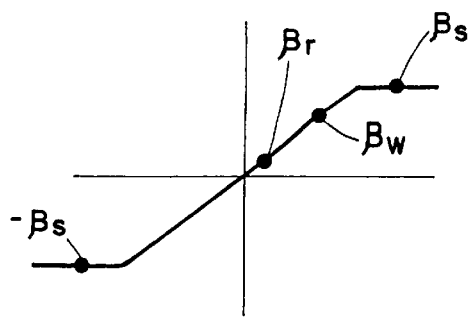
FIG. 11d is a generalized β-H curve associated with the operation of FIGS. 11a–11c.

As illustrated generally in FIG. 11a, when primary current $I_{pri}$ is flowing in the positive (forward) direction, current in the secondary $I_{sec}$ is generated to flow through diode D1 thereby generating a voltage across the load resistor R. Thus during the "set" period of operation, i.e. when a switch (not shown in FIG. 11a) associated with this current transformer is active, primary current $I_{pri}$, as depicted in FIG. 11b, flows through the primary winding. At $t_1$, the switch is deactivated and current returns to zero (0), awaiting the next power pulse. Output voltage $V_o$ across load R, shown in FIG. 11c, is also generated during the "set" portion of operation. As shown in FIG. 11d, during the "set" period flux density β is driven towards a working value $β_w$. When current stops flowing through the primary transformer at $t_1$ a reset operation occurs. This reset operates to drive the transformer from the flux density working value $β_w$ down to a residual flux density $β_r$. Proper reset operation stops the transformer from entering into saturation $-β_s$. Diode D1 is placed in the circuit so that the current transformer may be unloaded during the reset period. During the reset time the volt-seconds generated needs to equal the volts-seconds generated during the set period.

Figure 12A:
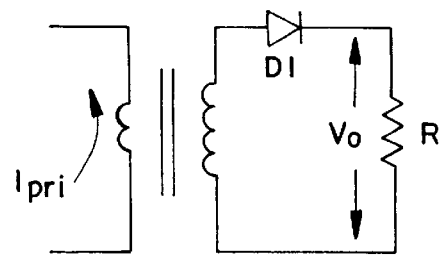
FIG. 12a depicts a simplified schematic of a current transformer with negative current flowing in the primary.

In FIG. 12a a transformer circuit similar to that in FIG. 11a is provided. The major distinction is primary current $I_{pri}$ is flowing in a negative (reverse) direction at the beginning of the power pulse. This reverse current is of special concern when there is an extremely light load or no-load for the resonant transition circuit.

Figure 12B:
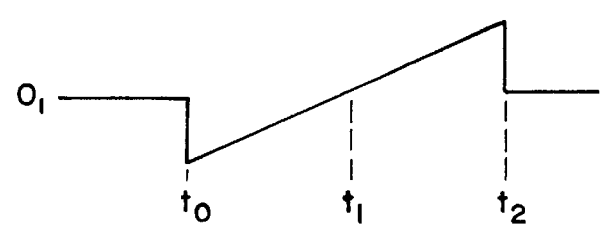
Figure 12C:
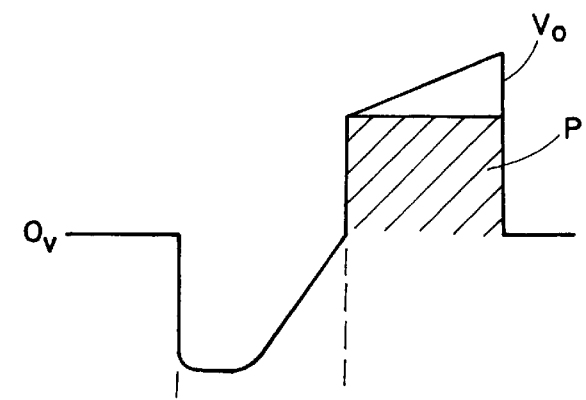
Figure 12D:
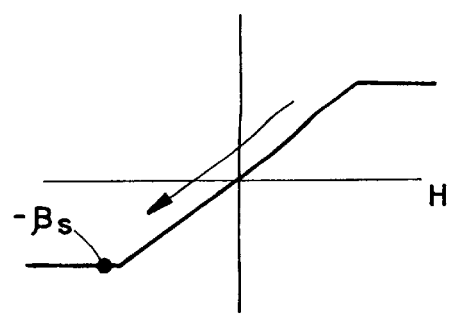
FIG. 12d is a generalized β-H curve associated with the FIGS. 12a–12c.

FIG. 12b shows that the primary current $I_{pri}$ of the current transformer at the start of a power pulse, $t_o$, is negative. This negative current, which may last until half-way through the power pulse (i.e. $t_1$), develops a large negative voltage (see FIG. 12c), causing additional reset of the transformer during time $t_0$ to $t_1$. Due to this, and as shown in FIG. 12d, the transformer is driven to negative saturation $-β_s$. From time $t_1$ to time $t_2$ primary current $I_{pri}$ crosses zero and is reversed in its flow to a positive direction. At this time energy stored during the reverse saturation appears to fly out of the current transformer causing a pedestal, P, of output signal voltage.

Active clamps 45, 47 of the present invention assist in correcting the above discussed undesirable situation. Active clamps 45, 47 are made active when an associated switch is driven with a power pulse. Therefore, whenever one of the associated switches receives a power pulse, active clamps 45, 47 receive a drive signal corresponding to the power pulse. The logic to perform the above actions are provided for in the logic of controller 20 and may be implemented in various known arrangements.

Figure 1:
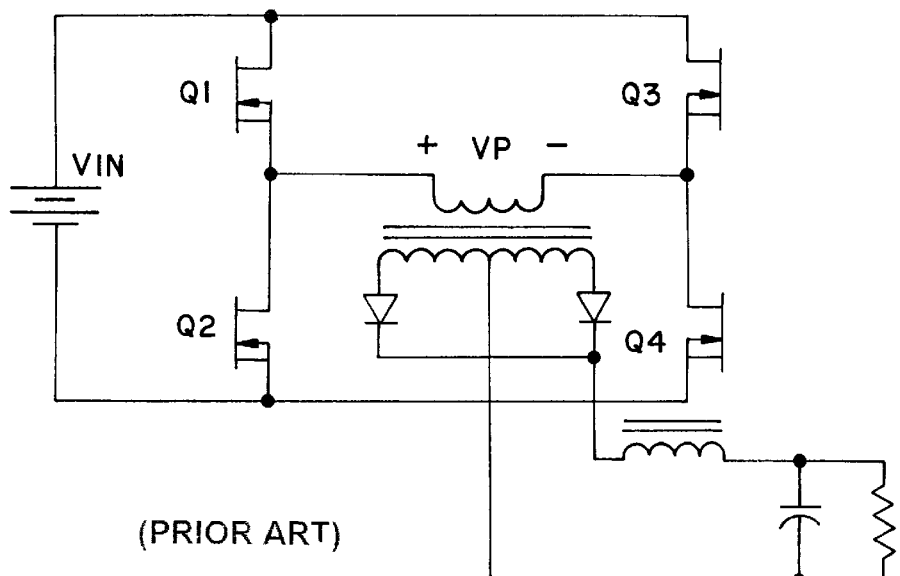
FIG. 1 is a schematic diagram of a prior art phase shifted full-bridge converter.
Figure 2:
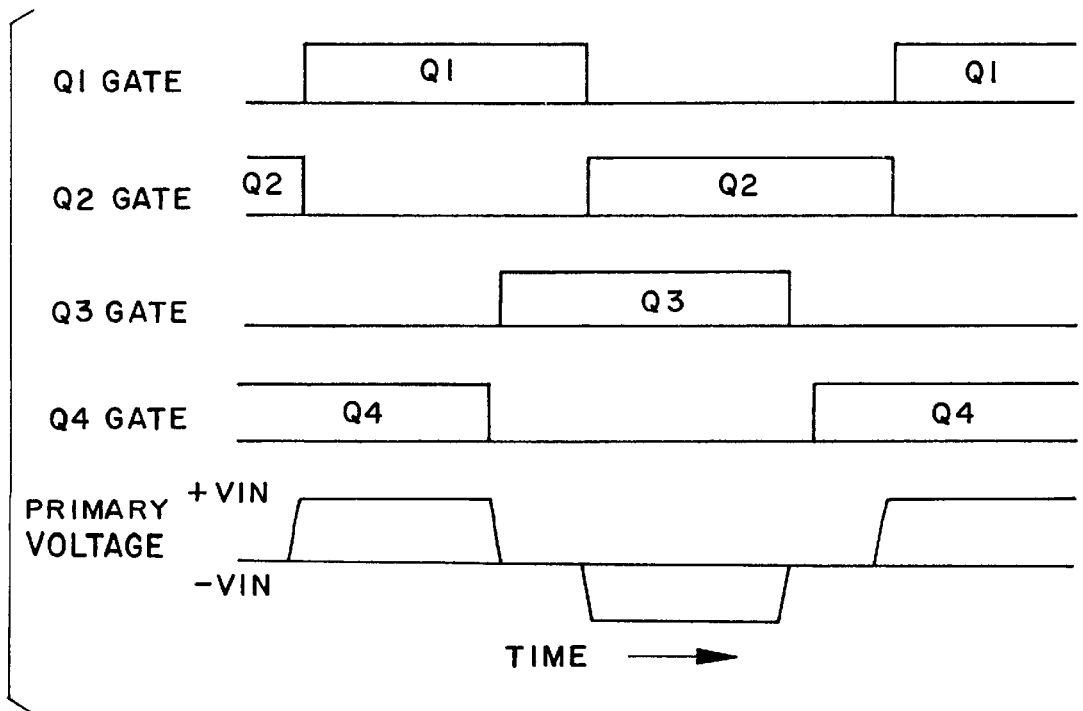
FIG. 2 is a set of waveform diagrams on a common time scale, showing the gate voltages of the four transistors in the full-bridge and the resulting primary voltage, respectively, from the operation of the converter of FIG. 1.
Figure 6:
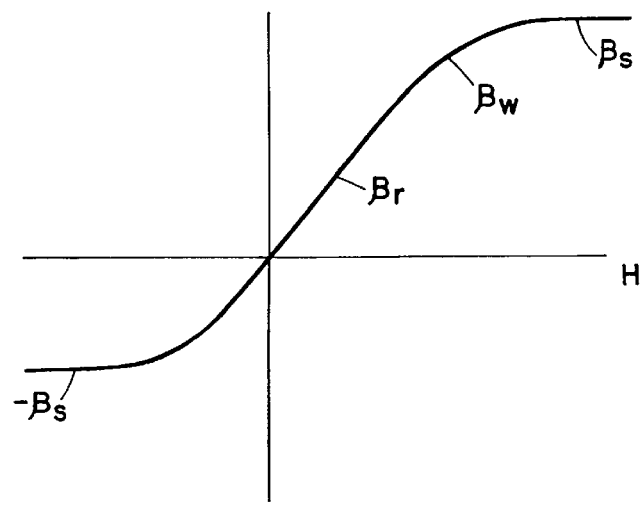
FIG. 6 is a generalized βH curve.
Figure 7:
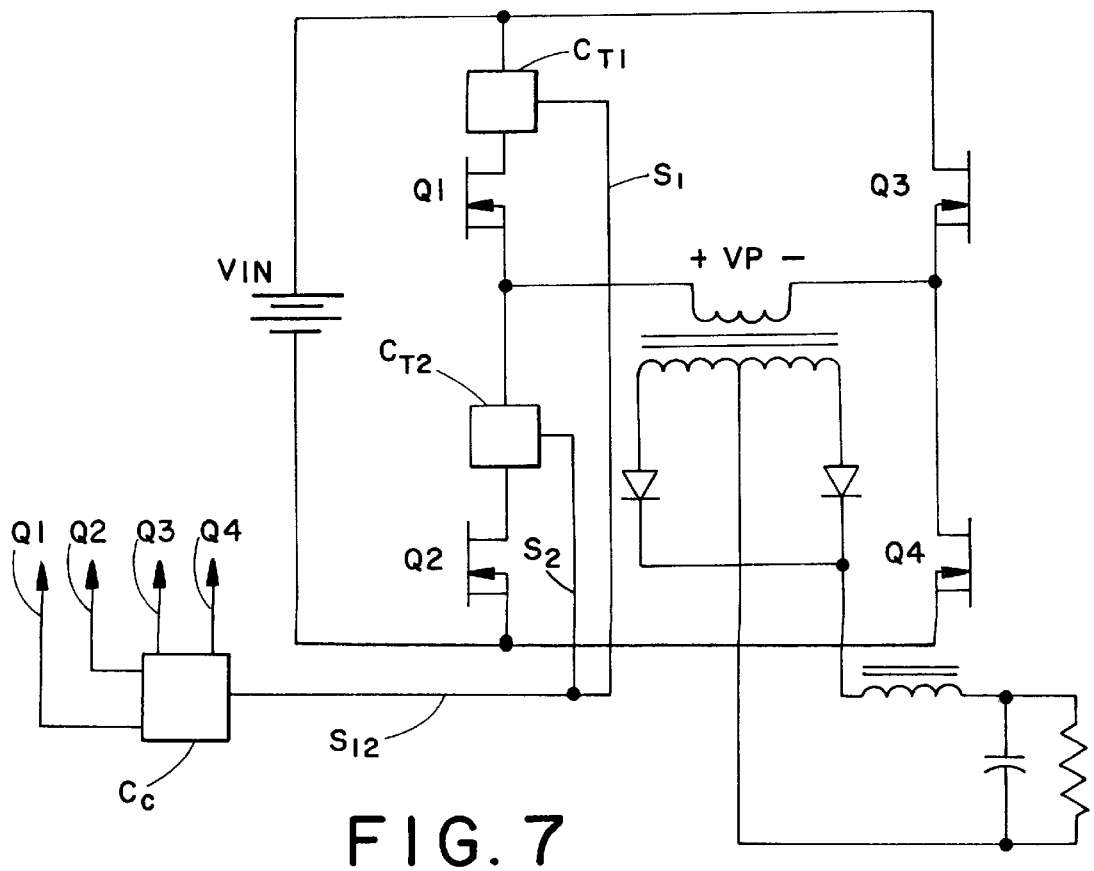
FIG. 7 is a schematic diagram of a prior art phase shifted full-bridge converter including current transformers ($C_{T1}$, $C_{T2}$) located in the drains of switches (Q1, Q2)
Figure 8:
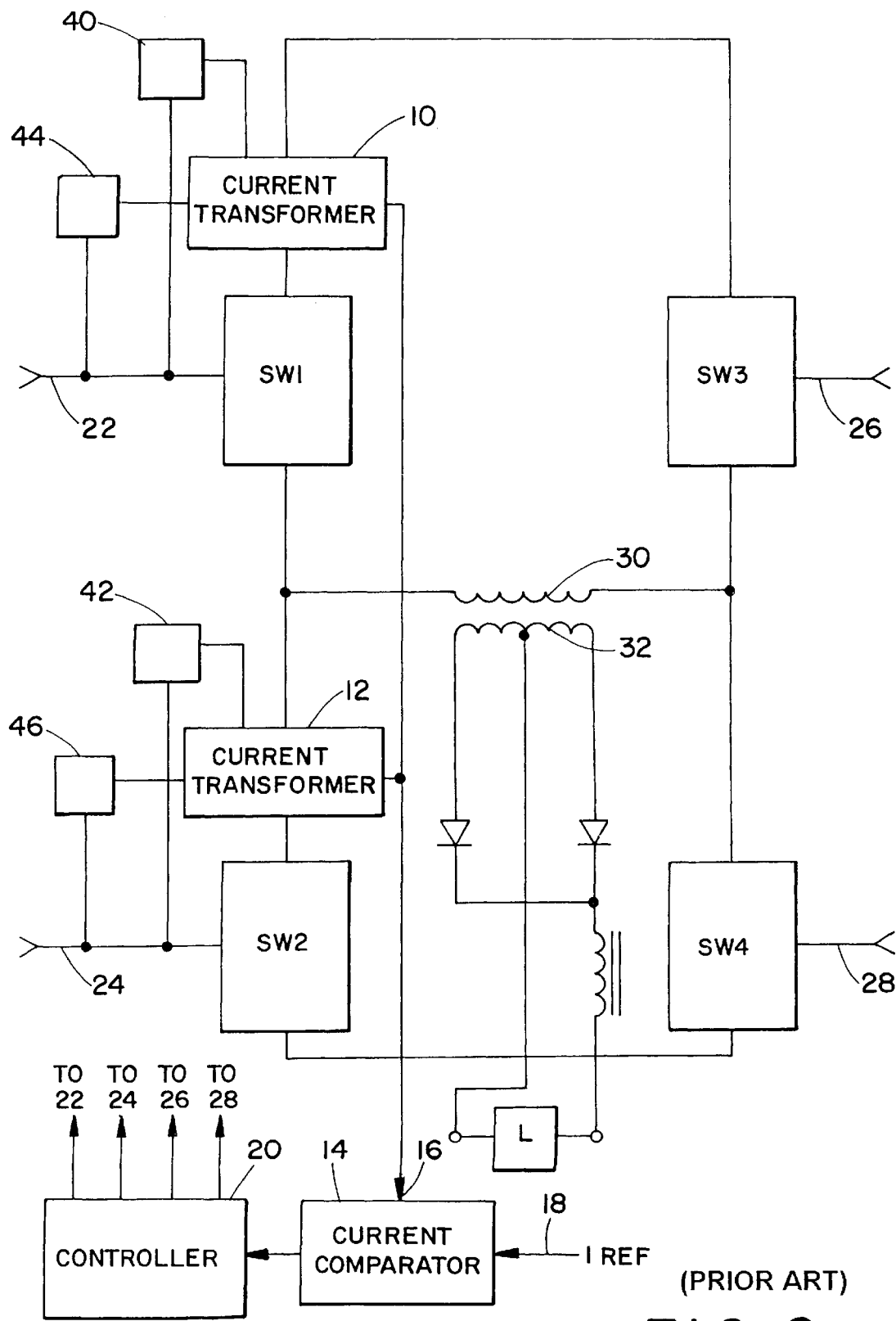
FIG. 8 provides a schematic illustration of a circuit incorporating an active clamp and current generator.
Figure 9A:
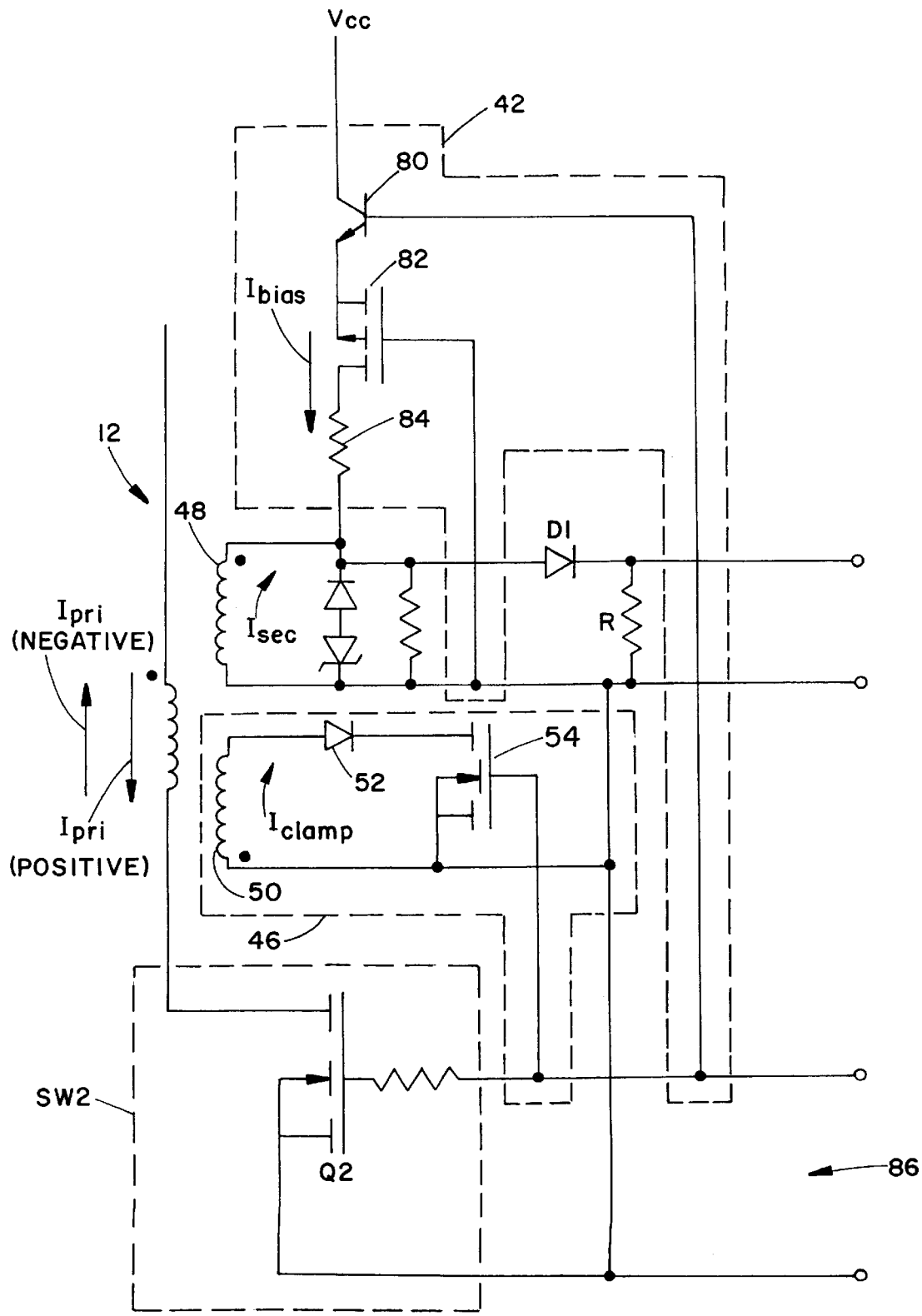
FIG. 9a provides a more detailed schematic of the active clamp and current generator of FIG. 8.
Figure 14:
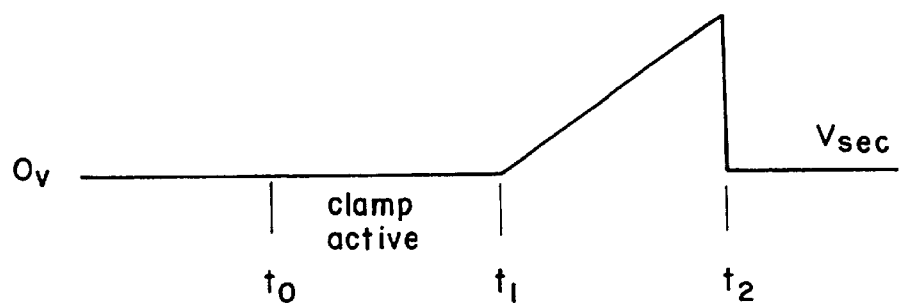
FIG. 14 shows clamped voltage output in an embodiment of the present invention.
Figure 9B:
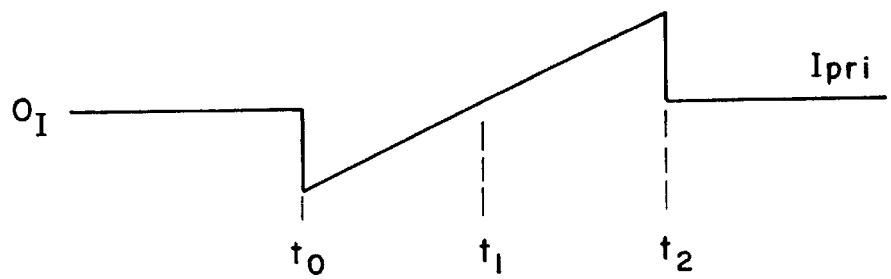
Figure 9C:
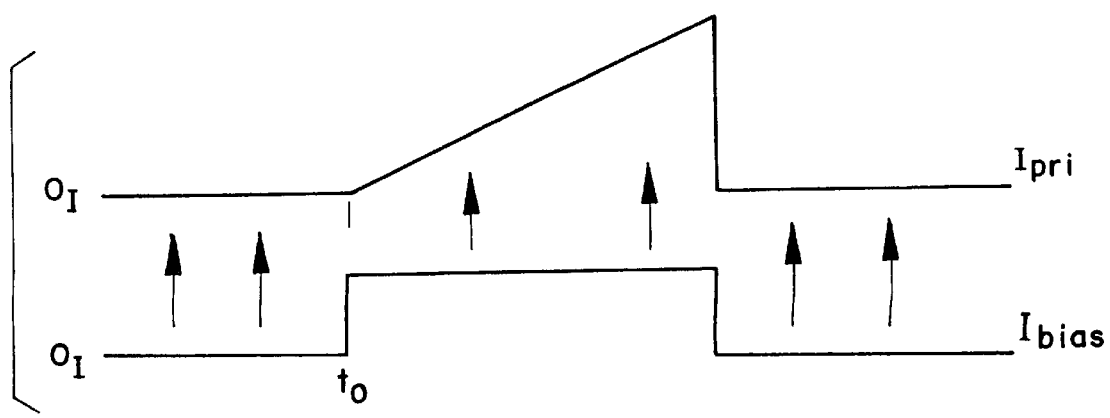
Figure 13:
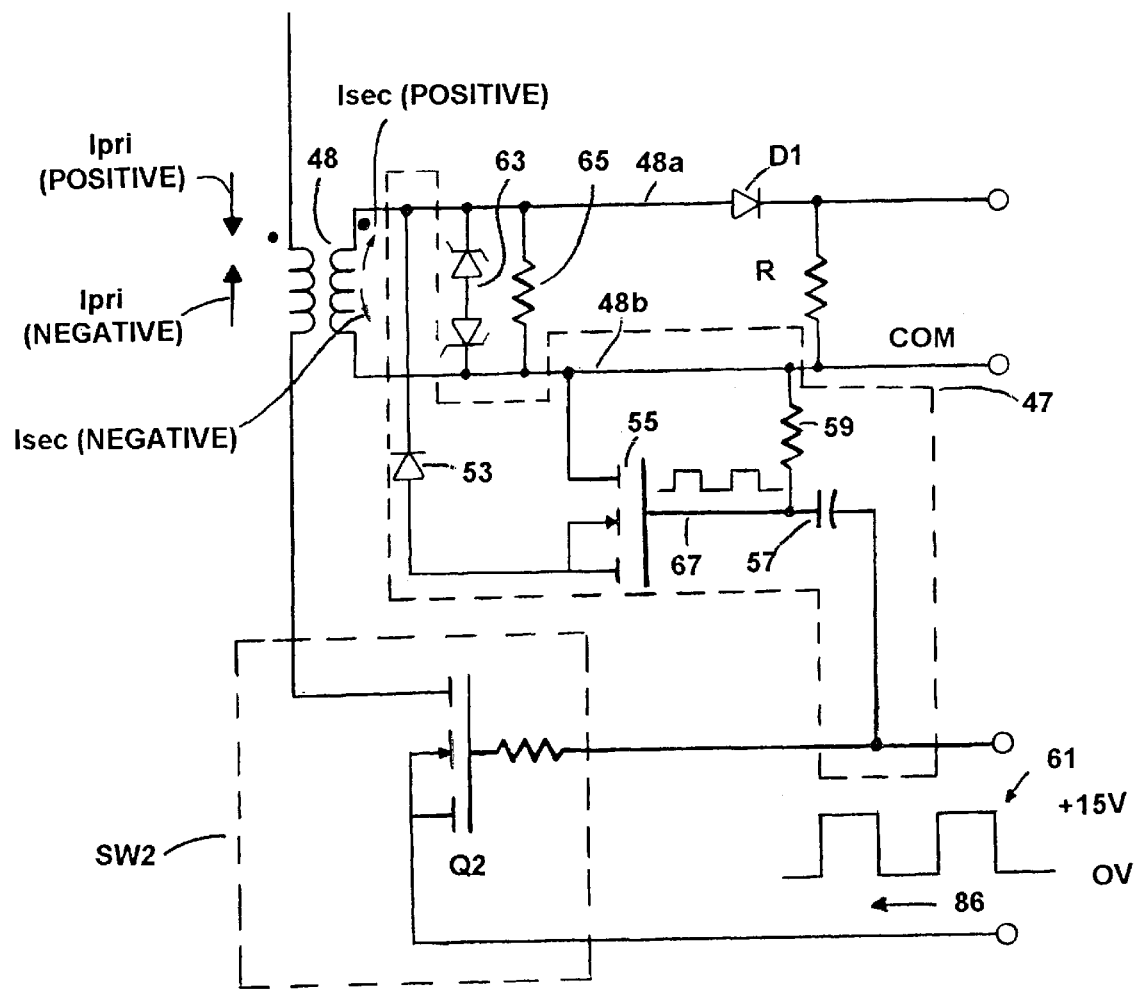
FIG. 13 sets forth a detailed schematic of the current transformer, switch and active clamp of the present invention.

FIG. 13 sets forth current transformer 12, switch SW2 and active clamp of FIG. 10 in greater detail. It is to be appreciated, however, that the discussion regarding the active clamp 47 in connection with current transformer 12 and switch SW2 is equally appropriate to the arrangement of switch SW1, current transformer 10, and active clamp 45. It is also to be appreciated that while FIG. 10 does not include the current generator discussed in connection with FIG. 8, these generators can also be used in a circuit including active clamp 45, 47 of the present invention.

Attention will now be directed to the operation of active clamp 47 of FIG. 13, which is configured to operate in direct connection with secondary winding 48 of current transformer 12. By such an arrangement, a separate auxiliary secondary winding is not required. Eliminating the need of auxiliary winding increases operation efficiency of the active clamp by lowering losses which exist due to the use of a separate winding. Further, by eliminating the need for the auxiliary winding, the number of interconnections and components necessary are also lowered thereby providing an economic benefit.

Active clamp 47 includes diode 53 whose cathode is connected to rail 48a of current transformer secondary 48, and whose anode is connected to a source of common drain FET 55. The drain of common drain FET 55 is connected to rail 48b of current transformer secondary 48. The input to FET 55 is a resistive capacitive network, which includes capacitor 57 and resistor 59. Active clamp 47 and transistor Q2 of switch SW2 are driven by the same drive pulse (also called power pulse) 61 at 86. Therefore, active clamp 47 becomes operable only during the time switch SW2 is turned on. As illustrated by dot notation, when the primary winding of current transformer 12 is positive and the primary current $I_{pri}$ is "forward" or positive secondary current $I_{sec(positive)}$ will go through diode D1 to load resistor R. On the otherhand, when current in the primary winding is "reverse" or negative, current in the secondary $I_{sec(negative)}$ is also reversed and blocked from passing through diode D1.

In the present invention the secondary current $I_{sec(negative)}$ is provided with a low voltage drop pathway through FET 55 and diode 53 to rail 48a of current transformer secondary 48. This pathway is available during the negative going cycle of power pulse 61, since active clamp 47 is active when power pulse 61 turns on transistor Q2 of switch SW2.

During the time switch SW2 is on and the current is negative, active clamp 47 acts as a load allowing the current generated due to the reverse or negative primary current $I_{pri}$ to flow through the current transformer 12. In this manner, instead of developing volt-seconds which upon the primary current becoming positive causes instability, these volt-seconds are not developed, and the large negative voltage is avoided. When the primary current $I_{pri}$ crosses zero and becomes positive excessive volt-seconds have not been stored. The voltage is held down on the current transformer 12 during the negative going time period and when the current turns positive the current will flow through the secondary of the current transformer in normal operation.

When there is no power pulse 61 the current transformer appears in an unencumbered state. Neither active clamp 47 or resistor R acts to load current transformer 12. The only elements which act to load current transformer 12 during this non-active time are diode pair 63 and/or resistor 65. It is to be appreciated that these elements are commonly used and may be used together or separately for loading during the natural reset of the current transformer.

Active clamp 47 takes advantage of the existing current transformer secondary winding 48, allowing it to provide a simple circuit for driving FET 55, which includes capacitor 57 and resistor 59 to ensure a proper drive signal. It is known that when passing a signal (such as power pulse 61 of the present invention) through a capacitor the signal will lose its DC component. Therefore, it is necessary to re-establish the DC component after the signal has passed through the capacitor. In active clamp 47, resistor 59 acts to re-establish the DC bias for gate drive signal 67, which drives the gate of FET 55. This arrangement provides the gate drive signal 67 to the gate without requiring a large number of components in a complex configuration.

When $I_{pri}$ is negative, the secondary current $I_{sec(negative)}$ comes out of the non-dot, and into the drain of FET 55, which is an n-channel FET provided in a common drain configuration. Due to this configuration the drain receives a positive signal coming out of the non-dot. Further, the current flows into the drain and then out of the source of FET 55, into the anode and out of the cathode of diode 53 and then back into the dot. This is the loop for the current which flows out of the non-dot during the negative primary, i.e. the reverse primary current.

It has been disclosed that FET 55 is turned on at the same time gate drive pulse 61 goes positive by a drive signal 67 which corresponds to gate drive pulse 61. However, as previously noted, it is not possible to pass gate drive pulse 61 directly to FET 55. This is true, since it would not be possible to turn FET 55 off as the gate would be pulled up either to the drain or above (in this example approximately 15 volts above the drain) thereby essentially maintaining FET 55 in a constant active state.

In the present invention, the gate drive pulse 61 goes through capacitor 57 and a new DC level is established by use of register 59. Use of capacitor 57 is important as it allows the movement of the DC level of the drive signal 67 to a proper level to operate FET 55. Particularly, the drive signal 67 to FET 55 needs to be moved to a level that will allow the signal to go positive in order to place FET 55 to an on state and will also allow the signal to go negative in order to turn FET 55 off.

When gate drive pulse 61 goes positive, e.g. to 15 volts, the signal for the gate of FET 55 will also go positive. In this example which shows the gate drive pulse 61 at a 5% duty cycle, drive signal 67 will go from 0 to 7½ volts. Then when gate drive 61 goes back to 0 volts, drive signal 67 will go negative, e.g. to −7½ volts, due to the DC bias. When the current $I_{pri}$ in current transformer 12 goes positive, during the gate drive pulse 61, FET 55 will be maintained in an on state, however, the current of the current transformer will be able to go through D1 to the current load R.

Though the present invention has been discussed in connection with resonant transition circuits, it may also be used in circuits such as inverters and other circuits which encounter high negative initial current.

The invention has been described with reference to the preferred embodiment. Obviously, modifications and alterations will occur to others upon reading and understanding the preceding detailed description. It is intended that the invention be construed as including all such alterations and modifications insofar as they come within the scope of the appended claims or the equivalence thereof.

Having thus described the preferred embodiment, I now claim:

1. A current transformer assembly comprising:
   a primary current transformer winding circuit for carrying primary current in a first and a second direction dependent upon composition of a received primary side power pulse;
   a secondary current transformer winding circuit magnetically linked to the primary current transformer winding circuit, configured to generate secondary current when the primary current in the first direction is flowing, and having a first rail and a second rail; and
   an active clamp including,
      a diode having a cathode and an anode,
      a field effect transistor (FET), and
      a resistive capacitive network including a resistor and a capacitor,
      wherein the cathode of the diode is connected to the first rail of the secondary current transformer winding circuit, the anode of the diode is connected to a source of the FET, a drain of the FET is connected to the second rail of the secondary current transformer winding circuit, a first end of the resistor is connected to the second rail of the secondary current transformer winding circuit, a second end of the resistor connected to a first side of the capacitor, and a second side of the capacitor is connected to receive a drive pulse.

2. The current transformer assembly according to claim 1 wherein the active clamp circuit is configured to allow a clamp current to flow in the active clamp when the primary current flows in the second direction.

3. The current transformer assembly according to claim 1 wherein the FET is an N-channel FET in a common drain configuration.

4. The current transformer assembly according to claim 1 further comprising:
   a bias current generator inserted into the secondary current transformer winding circuit, including a first switch connected to receive the drive pulse and to turn to an on state upon receipt of the drive pulse, a second switch connected to the first switch and connected to receive the drive pulse such that the second switch is turned to an on state when the primary current is flowing in the second direction.

5. The current transformer assembly according to claim 1 wherein the resistor connected to the second rail of the secondary current transformer winding circuit and the first side of the capacitor is a biasing element.

6. The current transformer assembly according to claim 1 wherein a gate of the FET is configured to receive a gate drive signal having a polarity the same as the input signal when the input signal goes from zero to a positive value.

7. A current transformer assembly in a resonant transition full bridge converter circuit operating in a fixed frequency zero-voltage switching mode, using a plurality of FETs as switching elements activated upon receipt of a drive pulse at an associated drive terminal, the current transformer assembly comprising:
   a current transformer having,
      a primary current transformer winding circuit inserted into a drain or source of one of the FET switching elements, to carry a primary current, and
      a secondary current transformer winding circuit magnetically linked to the primary current transformer winding circuit to generate a secondary current when the primary current is positive; and an active clamp in direct physical connection with the secondary current transformer winding circuit, and activated simultaneously with, and for a same time period as the drive pulse at the associated drive terminal wherein the direct physical connection provides improved operational efficiency.

8. The current transformer assembly according to claim 7 wherein the active clamp further includes, a diode having a cathode and an anode, a field effect transistor (FET), and a resistive capacitive network including a resistor and a capacitor, wherein the cathode of the diode is connected to a first rail of the secondary current transformer winding circuit, the anode of the diode is connected to a source of the FET, a drain of the FET is connected to the second rail of the secondary current transformer winding circuit, a first end of the resistor is connected to the first rail of the secondary current transformer winding circuit, a second end of the resistor connected to a first side of the capacitor, and a second side of the capacitor is connected to receive an input signal.

9. The current transformer assembly according to claim 8 wherein the FET is an N-channel FET in a common drain configuration.

10. The current transformer assembly according to claim 7 wherein the active clamp circuit is configured to allow a clamp current to flow in the active clamp when the primary current flows in the second direction.

11. A converter comprising:

a resonant transition full bridge converter circuit operating in a fixed frequency zero-voltage switching mode, using a plurality of FETs as switching elements activated upon receipt of a drive pulse at an associated drive terminal;

a primary current transformer winding circuit inserted into a drain or source of one of the FET switching elements to carry a primary current;

a secondary current transformer winding circuit magnetically linked to the primary current transformer winding circuit to generate a secondary current when the primary current is positive; and an active clamp, in direct physical connection with the secondary current transformer winding circuit, and including a switch activated simultaneously with, and for a same time period as the drive pulse at the associated drive terminal whereby the active clamp is operational for a period substantially equal to a time the switch is active.

12. The converter according to claim 11 wherein the active clamp further includes, a diode having a cathode and an anode, a field effect transistor (FET) as the switch, and a resistive capacitive network including a resistor and a capacitor, wherein the cathode of the diode is connected to the first rail of the secondary current transformer winding circuit, the anode of the diode is connected to a source of the FET, a drain of the FET is connected to the second rail of the secondary circuit transformer winding circuit, a first end of the resistor is connected to common of the secondary current transformer winding circuit, a second end of the resistor connected to a first side of the capacitor, and a second side of the capacitor is connected to receive an input signal.

13. The converter according to claim 11 wherein the switch is a N-channel FET in a common drain configuration.

14. The converter according to claim 11 wherein the active clamp circuit is configured to allow a clamp current to flow in the active clamp when the primary current flows in the second direction.

15. The converter according to claim 11 further comprising:

a bias current generator inserted into the secondary current transformer winding circuit, including a first switch connected to receive the drive pulse and to turn to an on state upon receipt of the drive pulse, a second switch connected to the first switch and connected to receive the drive pulse such that the second switch is turned to an on state when the primary current is flowing in the second direction.

16. The converter according to claim 11 wherein the resistor connected to the second rail of the secondary current transformer winding circuit and the first side of the capacitor is a biasing element.

17. The converter according to claim 11 wherein a gate of the FET is configured to receive a gate drive signal having a polarity the same as the input signal when the input signal goes from zero to a positive value.

* * * * *